(12) United States Patent
Waku et al.

(10) Patent No.: US 8,996,233 B2
(45) Date of Patent: Mar. 31, 2015

(54) VEHICLE ENGINE STOP CONTROL DEVICE AND METHOD

(71) Applicant: Jatco Ltd, Fuji-shi, Shizuoka (JP)

(72) Inventors: Kousuke Waku, Hadano (JP); Hideshi Wakayama, Hadano (JP); Noritaka Aoyama, Okazaki (JP)

(73) Assignee: Jatco Ltd, Fuji-shi (JP)

( * ) Notice: Subject to any disclaimer, the term of this patent is extended or adjusted under 35 U.S.C. 154(b) by 137 days.

(21) Appl. No.: 13/684,867

(22) Filed: Nov. 26, 2012

(65) Prior Publication Data

US 2013/0151109 A1  Jun. 13, 2013

(30) Foreign Application Priority Data

Dec. 8, 2011 (JP) ................. 2011-268546

(51) Int. Cl.
G01M 17/00 (2006.01)
G06F 17/00 (2006.01)
F16H 61/00 (2006.01)
F16H 61/12 (2010.01)

(52) U.S. Cl.
CPC ............ *G06F 17/00* (2013.01); *F16H 61/0021* (2013.01); *F16H 61/0025* (2013.01); *F16H 61/12* (2013.01); *F16H 61/0031* (2013.01); F16H 2061/1208 (2013.01); F16H 2312/14 (2013.01)
USPC ............................... 701/29.2; 701/54; 701/99

(58) Field of Classification Search
CPC ....... F16H 1/0031; F16H 1/12; F16H 1/0025; F16H 1/0021; F16H 2312/14; F16H 2061/1208

USPC .......... 701/29.2, 51, 54, 99; 180/65.26–65.28
See application file for complete search history.

(56) References Cited

U.S. PATENT DOCUMENTS

| 6,336,888 | B1 | 1/2002 | Eguchi |
| 2004/0029677 | A1* | 2/2004 | Mori et al. ................. 477/3 |
| 2012/0296509 | A1 | 11/2012 | Wakita |

FOREIGN PATENT DOCUMENTS

| JP | 2001-030801 A | 2/2001 |
| JP | 2002-130143 A | 5/2002 |
| JP | 2002-130144 A | 5/2002 |
| JP | 2006-152868 A | 6/2006 |
| WO | WO 2011/089818 A1 | 7/2011 |

OTHER PUBLICATIONS

Machine Translation of JP 2006-152868 (Jun. 15, 2006).*

* cited by examiner

*Primary Examiner* — Thomas Tarcza
*Assistant Examiner* — Kevin Myhre
(74) *Attorney, Agent, or Firm* — Foley & Lardner LLP (57) ABSTRACT

A vehicle control device controls a vehicle including a first oil pump adapted to be driven by power generated by a first drive source, automatically stop when a predetermined condition is satisfied, and supply oil to a power transmission unit and a second oil pump adapted to supply oil to the power transmission unit when the drive source is in an automatically stopped state, and includes a control unit adapted to continue an automatic stop until it is determined to restart the first drive source based on a parameter with which a reduction in drive force responsiveness to a drive force request from a driver, not including the stop of the first drive source, can be determined after an automatic stop command of the first drive source is output and if there is an abnormality in the second oil pump.

15 Claims, 7 Drawing Sheets

VEHICLE ENGINE STOP CONTROL DEVICE AND METHOD

TECHNICAL FIELD

The present invention relates to a vehicle control device and a vehicle control method.

BACKGROUND ART

JP2006-152868A discloses a control device which, in a vehicle including a mechanical oil pump to be driven by the rotation of a drive source transmitted thereto and an electrical oil pump for supplying a hydraulic pressure when the drive source is in an automatically stopped state, supplies a hydraulic pressure by the mechanical oil pump by restarting the drive source immediately after the drive source is stopped after the drive source automatically stops and if there is an abnormality in the electrical oil pump.

SUMMARY OF THE INVENTION

However, since the drive source is restarted to cause the mechanical oil pump to generate the hydraulic pressure immediately after the drive source is stopped in the above invention, the drive source may be restarted when it is actually not necessary to restart the drive source, which causes a problem that extra fuel and power are consumed by the drive source.

The present invention was developed to solve such a problem and aims to inhibit the restart of a drive source when it is not necessary to restart the drive source even if an abnormality occurs in an electrical oil pump, thereby reducing fuel and power consumed by the drive source and improving fuel mileage and electric mileage.

One aspect of the present invention is directed to a vehicle control device for controlling a vehicle including a first drive source adapted to automatically stop based on an automatic stop command when a predetermined condition is satisfied; a power transmission unit arranged between the first drive source and drive wheels and adapted to transmit power according to a supplied or discharged hydraulic pressure; a first oil pump adapted to be driven by power generated by the first drive source and supply oil to the power transmission unit; and a second oil pump adapted to be driven by a second drive source different from the first drive source and supply the oil to the power transmission unit when the drive source is in a state of the automatic stop; the vehicle control device including an abnormality determination unit adapted to determine whether or not there is an abnormality in the second oil pump; and a control unit adapted to continue the automatic stop until it is determined to restart the first drive source based on a parameter with which a reduction in drive force responsiveness to a drive force request from a driver, not including the stop of the first drive source, can be determined after the automatic stop command of the first drive source is output and if there is an abnormality in the second oil pump.

Another aspect of the present invention is directed to a vehicle control method for controlling a vehicle including a first drive source adapted to automatically stop based on an automatic stop command when a predetermined condition is satisfied; a power transmission unit arranged between the first drive source and drive wheels and adapted to transmit power according to a supplied or discharged hydraulic pressure; a first oil pump adapted to be driven by power generated by the first drive source and supply oil to the power transmission unit; and a second oil pump adapted to be driven by a second drive source different from the first drive source and supply the oil to the power transmission unit when the drive source is in a state of the automatic stop; the vehicle control method including continuing the automatic stop until it is determined to restart the first drive source based on a parameter with which a reduction in drive force responsiveness to a drive force request from a driver, not including the stop of the drive source, can be determined after the automatic stop command of the first drive source is output and if there is an abnormality in the second oil pump.

According to these aspects, the automatic stop is continued until it is determined to restart the first drive source based on the parameter with which a reduction in drive force responsiveness to a drive force request from the driver, not including the stop of first drive source, can be determined after the automatic stop command of the first drive source is output and if there is an abnormality in the second oil pump. Thus, fuel mileage and electric mileage can be improved by reducing fuel and power consumed by the first drive source.

DESCRIPTION OF THE PREFERRED EMBODIMENTS

Hereinafter, an embodiment of the present invention is described with reference to the accompanying drawings. It should be noted that, in the following description, a "speed ratio" of a certain transmission is a value obtained by dividing an input rotation speed of this transmission by an output rotation speed thereof. Further, a "lowest speed ratio" is a maximum speed ratio of this transmission used such as at the time of starting a vehicle. A "highest speed ratio" is a minimum speed ratio of this transmission.

Figure 1:
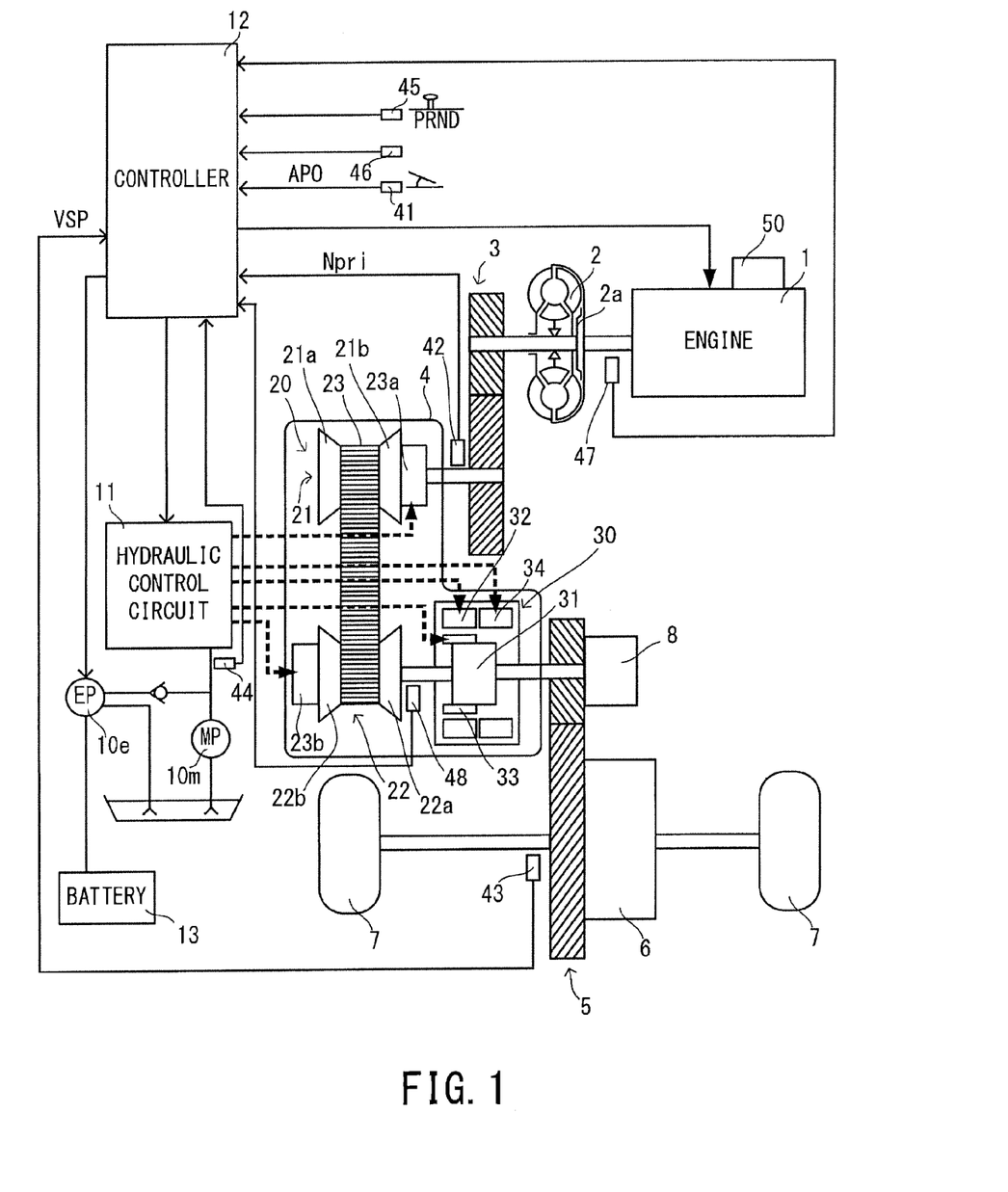
FIG. 1 is a schematic configuration diagram of a coast stop vehicle according to an embodiment.

FIG. 1 is a schematic configuration diagram of a coast stop vehicle according to this embodiment of the present invention. This vehicle includes an engine 1 as a drive source, and output rotation of the engine 1 is transmitted to drive wheels 7 via a torque converter 2 with a lock-up clutch 2a, a first gear train 3, a continuously variable transmission (hereinafter, merely referred to as a "transmission 4"), a second gear train 5 and a differential gear unit 6. The second gear train 5 includes a parking mechanism 8 for mechanically locking an output shaft of the transmission 4 in a parked state so as not to be able to rotate. The vehicle includes a starter 50 for starting the engine 1 by rotating a crankshaft of the engine 1.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body, an electric motor and a motor driver for driving and rotating the oil pump main body, and can control an operating load to an arbitrary load or in multiple steps. Further, the transmission 4 includes a hydraulic control circuit 11 for adjusting a hydraulic pressure (hereinafter, referred to as a "line pressure") from the mechanical oil pump 10m or the electrical oil pump 10e and supplying the adjusted hydraulic pressure to each component of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected upstream of (input shaft side) the variator 20.

The variator 20 includes a primary pulley 21, a secondary pulley 22 and a V-belt 23 mounted between the pulleys 21 and 22. Each of the pulleys 21, 22 includes a fixed conical plate 21a, 22a, a movable conical plate 21b, 22b arranged with a sheave surface faced toward the fixed conical plate 21a, 22a and forming a V-groove between the fixed conical plate 21a, 22a and the movable conical plate 21b, 22b, and a hydraulic cylinder 23a, 23b provided on the back surface of the movable conical plate 21b, 22b for displacing the movable conical plate 21b, 22b in an axial direction. When a hydraulic pressure supplied to a pulley hydraulic pressure chamber of each hydraulic cylinder 23a, 23b is adjusted, the width of the V-groove changes to change a contact radius of the V-belt 23 and each pulley 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of a hydraulic pressure to a piston hydraulic pressure chamber of each frictional engagement element 32 to 34 is adjusted to change engaged and released states of each frictional engagement element 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio smaller than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Each of the frictional engagement elements is provided upstream or downstream of the variator 20 on the power transmission path and any of them enables power transmission of the transmission 4 when being engaged while disabling power transmission of the transmission 4 when being released.

Figure 2:
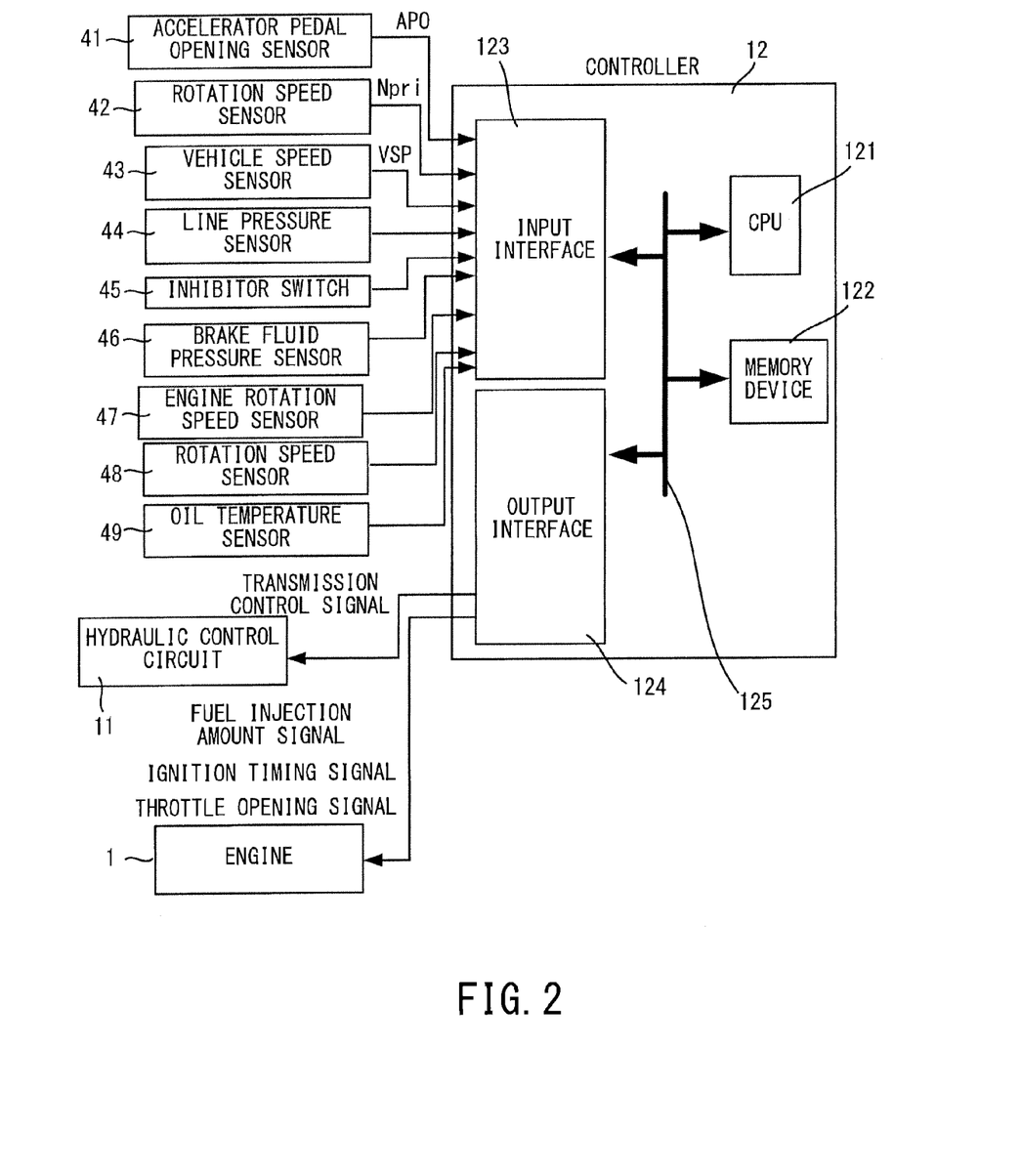
FIG. 2 is a schematic configuration diagram of a controller of the embodiment.

A controller 12 is for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21), an output signal of a rotation speed sensor 48 for detecting an output rotation speed of the transmission 4 (=rotation speed of the secondary pulley 22), an output signal of a vehicle speed sensor 43 for detecting a vehicle speed VSP, an output signal of a line pressure sensor 44 for detecting a line pressure, an output signal of an inhibitor switch 45 for detecting the position of a select lever, an output signal of a brake fluid pressure sensor 46 for detecting a brake fluid pressure, an output signal of an engine rotation speed sensor 47 for detecting a rotation speed of the crankshaft of the engine 1, an output signal of an oil temperature sensor 49 for detecting the temperature of oil supplied to the transmission 4, and like output signals.

A control program of the engine 1, a transmission control program of the transmission 4, and various maps and tables used in these programs are stored in the memory device 122. The CPU 121 reads the program stored in the memory device 122 and executes it, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and the motor driver of the electrical oil pump 10e via the output interface 124. Various values used in the computations by the CPU 121 and the results of these computations are appropriately stored in the memory device 122.

The hydraulic control circuit 11 includes a plurality of flow passages and a plurality of hydraulic control valves. In accordance with a transmission control signal from the controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e, and supplies this hydraulic pressure to each component of the transmission 4. In this way, the speed ratio of the variator 20 and the gear position of the sub-transmission mechanism 30 are changed to shift the transmission 4.

Figure 3:
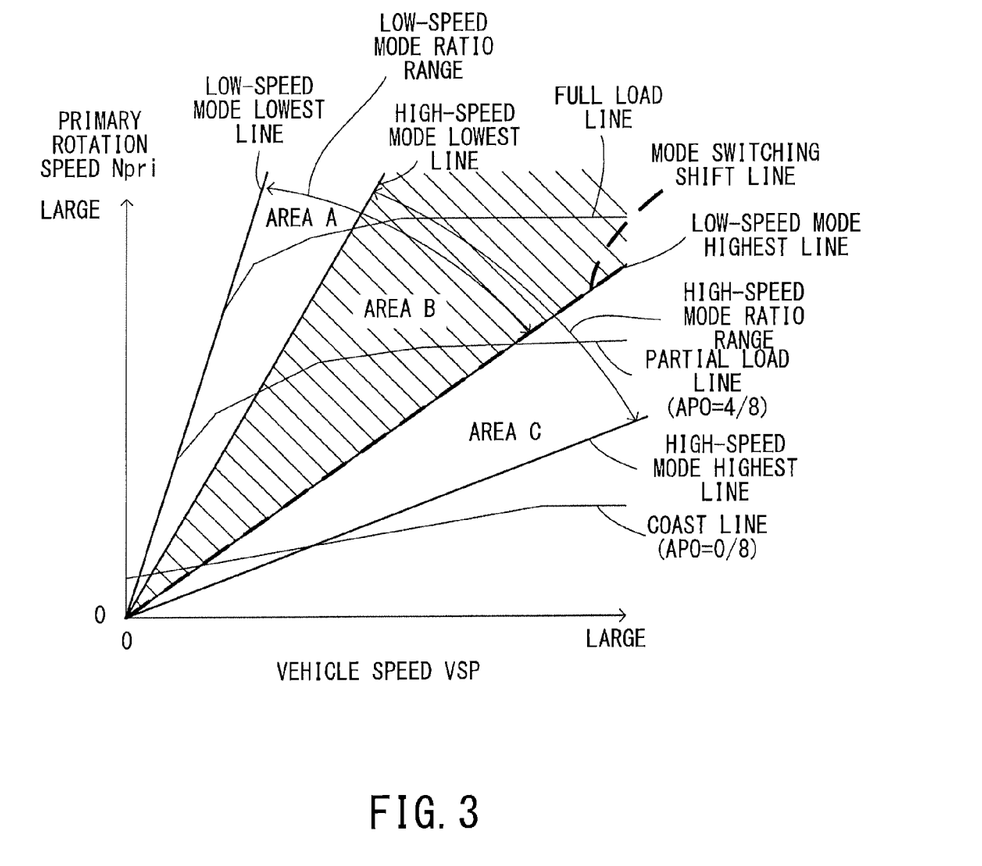
FIG. 3 is an example of a shift map.

FIG. 3 shows an example of the shift map stored in the memory device 122. The controller 12 controls the variator 20 and the sub-transmission mechanism 30 in accordance with an operating state of the vehicle (vehicle speed VSP, rotation speed of the primary pulley 21, rotation speed of the secondary pulley 22, and accelerator pedal opening APO in this embodiment) based on this shift map.

In this shift map, an operating point of the transmission 4 is determined by the vehicle speed VSP and the rotation speed of the primary pulley 21. The inclination of a line connecting the operating point of the transmission 4 and a zero point at the lower left corner of the shift map corresponds to the speed ratio of the transmission 4 (overall speed ratio obtained by multiplying a speed ratio of the variator 20 by a speed ratio of the sub-transmission mechanism 30, hereinafter, referred to as a "through speed ratio"). In this shift map, a shift line is set for each accelerator pedal opening APO similarly to a shift map of a conventional V-belt continuously variable transmission, and the transmission 4 is shifted in accordance with the shift line selected based on the accelerator pedal opening APO. It should be noted that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 at the lowest speed ratio and a low-speed mode highest line obtained by setting the speed ratio of the variator 20 at the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 at the lowest speed ratio and a high-speed mode highest line obtained by setting the speed ratio of the variator 20 at the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock at the time of shifting the sub-transmission mechanism 30 is suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 is changed. At this time, an inertia phase in which the speed ratio of the sub-transmission mechanism 30 actually changes and a period during which the speed ratio of the variator 20 changes are synchronized. The speed ratio of the variator 20 is changed in the direction opposite to the direction in which the speed ratio of the sub-transmission mechanism 30 is changed to prevent a change in the input rotation caused by a step in the actual through speed ratio Ratio from giving a sense of incongruity to a driver.

Specifically, when the actual through speed ratio Ratio of the transmission 4 changes from a low side to a high side over the mode switch speed ratio mRatio, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes from the high side to the low side over the mode switch speed ratio mRatio, the controller 12 changes the gear position of the sub-transmission mechanism 30 from the second gear position to the first gear position (2-1 shift) and changes the speed ratio of the variator 20 to the high side.

The controller 12 performs a coast stop control described below to suppress a fuel consumption amount.

The coast stop control is a control for suppressing the fuel consumption amount by automatically stopping the engine 1 (coast stop) during the travel of the vehicle in a low speed range. The coast stop control is common to a fuel-cut control performed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch 2a.

Upon performing the coast stop control, the controller 12 first determines, for example, conditions a to c listed below and the like. These conditions are, in other words, conditions for determining whether or not a driver has an intention to stop the vehicle.

a: accelerator pedal is not depressed at all (accelerator position APO=0)
b: brake pedal is depressed (brake fluid pressure is not lower than a predetermined value)
c: vehicle speed is a predetermined low speed (e.g. 9 km/h) or lower When all of these coast stop conditions (predetermined condition) are satisfied, the controller 12 performs the coast stop control by outputting a signal for automatically stopping the engine 1 and stopping fuel injection into the engine 1. On the other hand, if any one of the above coast stop conditions is no longer satisfied, the controller 12 finishes the coast stop control by outputting a signal for restarting the engine 1 and resuming fuel injection into the engine 1.

Figure 4:
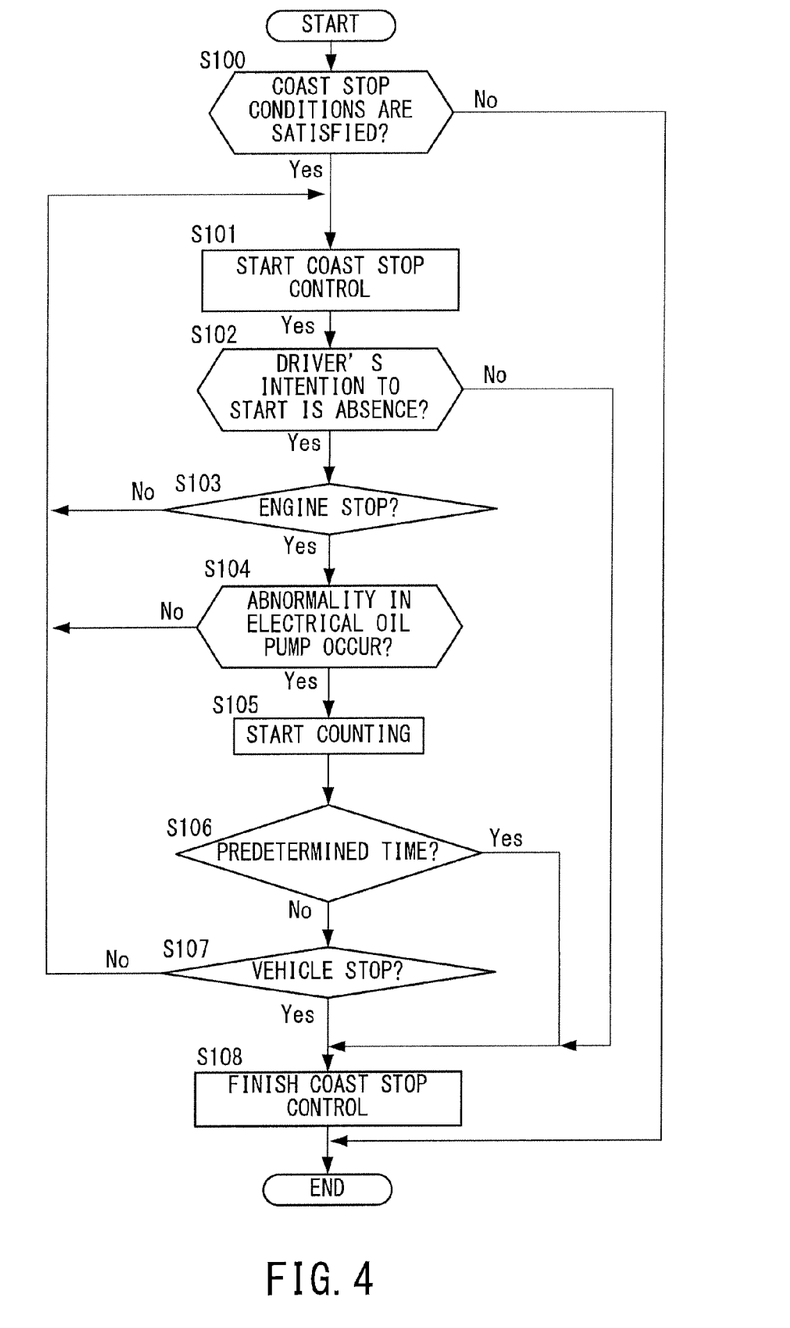
FIG. 4 is a flow chart showing a coast stop control of the embodiment.

Next, the coast stop control of this embodiment is described using a flow chart of FIG. 4.

In Step S100, the controller 12 determines whether or not all of the above coast stop conditions are satisfied. The controller 12 proceeds to Step S101 if 211 of the coast stop conditions are satisfied while finishing this control if any one of the coast stop conditions is not satisfied. If 211 of the coast stop conditions are satisfied, the controller 12 outputs an automatic stop command which is a signal for automatically stopping the engine 1.

In Step S101, the controller 12 starts the coast stop control by automatically stopping the engine 1.

In Step S102, the controller 12 determines whether or not the driver has an intention to start. The controller 12 proceeds to Step S103 in the absence of the driver's intention to start while proceeding to Step S108 in the presence of the driver's intention to start. The controller 12 determines the presence of the intention to start such as when the accelerator pedal is depressed or when the brake pedal is not depressed.

In Step S103, the controller 12 determines whether or not the engine 1 is at a stop. The controller 12 proceeds to Step S104 if the engine 1 is at a stop while returning to Step S101 to repeat the above control unless the engine 1 is at a stop. The controller 12 determines that the engine 1 is at a complete stop when the engine rotation speed is zero or not higher than a predetermined speed at which the engine 1 can be determined to be at a stop based on a signal from the engine rotation speed sensor 47.

In Step S104, the controller 12 determines whether or not there is an abnormality in the electrical oil pump 10e. The controller 12 proceeds to Step S105 if there is an abnormality in the electrical oil pump 10e while returning to Step S101 to repeat the above control if there is no abnormality in the electrical oil pump 10e. The controller 12 determines an abnormality in the electrical oil pump 10e such as when the electrical oil pump 10e is electrically disconnected or when a hydraulic pressure discharged from the electrical oil pump 10e is lower than a hydraulic pressure in normal time.

In Step S105, the controller 12 starts counting by a timer.

In Step S106, the controller 12 determines whether or not a timer count has reached a predetermined time (first predetermined time). The controller 12 proceeds to Step S107 unless the timer count has reached the predetermined time while proceeding to Step S108 if the timer count has reached the predetermined time. The predetermined time is a time until the amount of oil supplied to the transmission 4 becomes equal to or less than a predetermined oil amount at which the startability of the vehicle is reduced and the vehicle cannot smoothly restart after the engine 1 is stopped. The predetermined time is set by an experiment or the like in advance. The oil amount of the transmission 4 is the amount of oil in the pulley hydraulic pressure chamber of the variator 20, the piston hydraulic pressure chamber of the sub-transmission mechanism 30, an oil passage allowing communication between the pulley hydraulic pressure chamber and the mechanical oil pump 10m or the electrical oil pump 10e and an oil passage allowing communication between the piston hydraulic pressure chamber and the mechanical oil pump 10m or the electrical oil pump 10e.

If the engine 1 automatically stops, oil is no longer discharged from the mechanical oil pump 10m, an abnormality occurs in the electrical oil pump 10e and no oil is discharged also from the electrical oil pump 10e, the oil leaks from the pulley hydraulic pressure chamber of the variator 20, the piston hydraulic pressure chamber of the sub-transmission mechanism 30 and the oil passages communicating with the hydraulic pressure chambers and the amount of oil in the hydraulic pressure chambers and the oil passages gradually decreases. When the vehicle restarts, a desired hydraulic pressure needs to be generated so that a drive force can be transmitted without causing belt slippage of the V-belt 23 and, for example, the low brake 32 is quickly engaged. However, if the amount of oil in the hydraulic pressure chambers and the oil passages is small, the desired hydraulic pressure cannot be generated unless the hydraulic pressure chambers and the oil passages are first filled with oil and oil is further supplied to the hydraulic pressure chambers and the oil passages. Specifically, if the amount of oil in the hydraulic pressure chambers and the oil passages decreases, it takes a longer time until the desired hydraulic pressure is generated. If it takes a longer time until the desired hydraulic pressure is generated, a gripping force of the V-belt 23 when the vehicle restarts decreases in the variator 20 and a drive force transmitted to the drive wheels 7 when the vehicle restarts decreases. Further, belt slippage may deteriorate the V-belt 23 and the like. Further, if it takes a longer time until the desired hydraulic pressure is generated, it takes a longer time until, for example, the low brake 32 is engaged in the sub-transmission mechanism 30 and it takes a longer time until the drive force is transmitted to the drive wheel 7. The startability of the vehicle is reduced while oil is supplied to the transmission 4 in this way. Thus, in this embodiment, a time after the stop of the engine 1 is counted and a transition is made to Step S108 before the startability when the vehicle restarts is reduced if an abnormality occurs in the electrical oil pump 10e.

In Step S107, the controller 12 determines whether or not the vehicle has stopped. The controller 12 proceeds to Step S108 in preparation for the next start if the vehicle has stopped while returning to Step S101 to repeat the above control unless the vehicle has stopped. The controller 12 detects the vehicle speed based on an output signal from the vehicle speed sensor 43 and determines that the vehicle is at a stop if the vehicle speed is zero or not higher than the predetermined vehicle speed at which the vehicle can be determined to be at a stop.

The controller 12 proceeds to Step S108 if the controller 12 determines the presence of the driver's intention to start in Step S102, if the oil amount of the transmission 4 decreases and the controller 12 determines that the startability of the vehicle when the vehicle restarts is reduced in Step S106 and if the controller 12 determines that the vehicle has stopped in Step S107. That is, the controller 12 proceeds to Step S108 when determining to restart the engine 1 based on a parameter with which a reduction in drive force responsiveness to a drive force request from the driver, not including the stop of the engine 1, can be determined. To restart the engine 1 based on the parameter with which a reduction in drive force responsiveness to a drive force request from the driver, not including the stop of the engine 1, can be determined means to restart the engine 1 by the driver's operation, or to stop the vehicle and restart the engine 1 or to restart the engine 1 after the oil amount of the transmission 4 becomes the predetermined oil amount or less.

In Step S108, the controller 12 finishes the coast stop control and restarts the engine 1. By this, the mechanical oil pump 10m is driven and oil is discharged from the mechanical oil pump 10m and supplied to the transmission 4. It should be noted that the timer count is reset when the coast stop control is finished.

Next, time charts when the coast stop control is performed are described.

Figure 5:
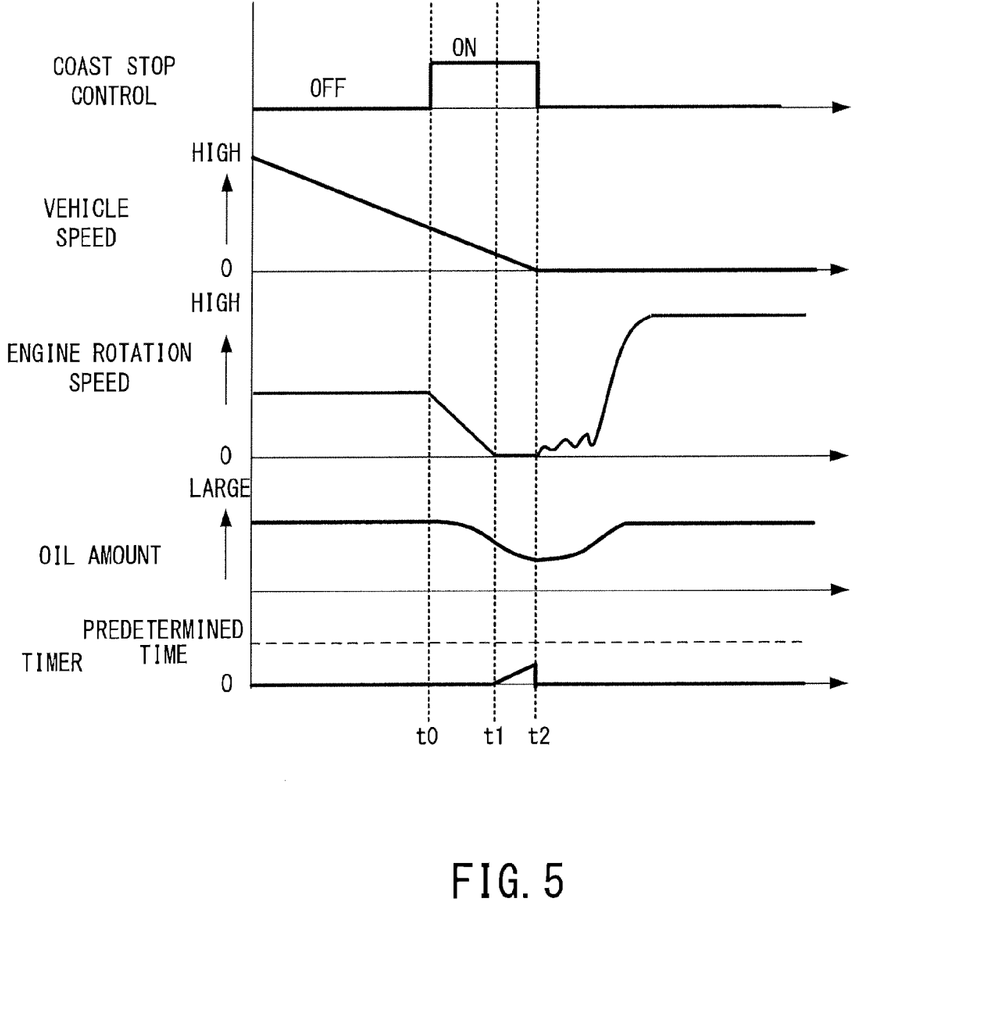
FIG. 5 is a time chart when a vehicle speed becomes zero and the coast stop control is finished.

FIG. 5 is a time chart when the vehicle speed becomes zero and the coast stop control is finished. It should be noted that the occurrence of an abnormality in the electrical oil pump 10e is assumed below. Further, the oil amount of the transmission 4 is described, taking the oil amount of the sub-transmission mechanism 30 as an example.

When the vehicle speed becomes a predetermined low vehicle speed and all of the coast stop conditions are satisfied at time t0, the coast stop control is started. By this, the engine 1 automatically stops and the engine rotation speed gradually decreases. Further, oil supplied from the mechanical oil pump 10m decreases due to the automatic stop of the engine 1, and no oil is supplied also from the electrical oil pump 10e due to the occurrence of the abnormality in the electrical oil pump 10e, wherefore the oil amount of the sub-transmission mechanism 30 decreases.

At time t1, the engine 1 stops. When the engine 1 stops, timer counting is started.

When the vehicle speed becomes zero and the vehicle stops at time t2, the coast stop control is finished and the engine 1 is restarted. When the engine 1 is restarted, oil is discharged from the mechanical oil pump 10m and supplied to the sub-transmission mechanism 30. Further, the timer count is reset before the predetermined time is reached.

Figure 6:
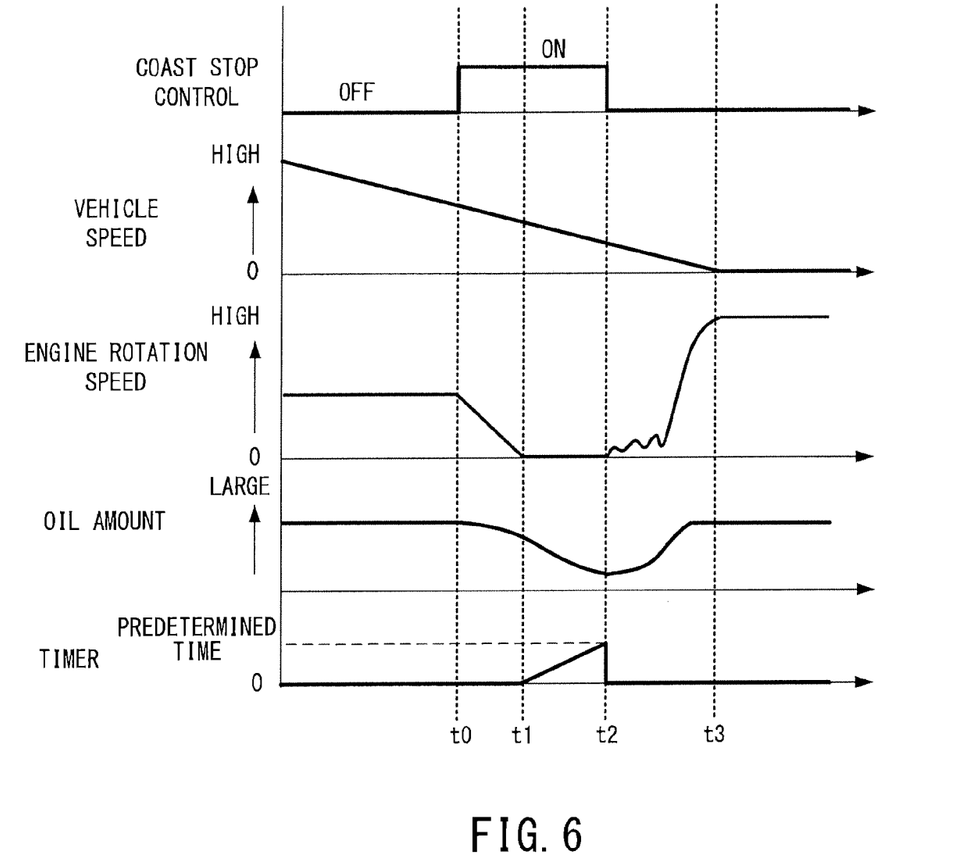
FIG. 6 is a time chart when a timer count reaches a predetermined time and the coast stop control is finished.

FIG. 6 is a time chart when the timer count reaches the predetermined time and the coast stop control is finished.

When the vehicle speed becomes the predetermined low vehicle speed and all of the coast stop conditions are satisfied at time t0, the coast stop control is started. By this, the engine 1 automatically stops and the engine rotation speed gradually decreases. Further, oil supplied from the mechanical oil pump 10*m* decreases due to the automatic stop of the engine 1, and no oil is supplied also from the electrical oil pump 10*e* due to the occurrence of the abnormality in the electrical oil pump 10*e*, wherefore the oil amount of the sub-transmission mechanism 30 decreases.

At time t1, the engine 1 stops. When the engine 1 stops, timer counting is started.

When the timer count reaches the predetermined time at time t2, the coast stop control is finished and the engine 1 is restarted. By this, oil discharged by the mechanical oil pump 10*m* is supplied to the sub-transmission mechanism 30 and a reduction in the oil amount of the sub-transmission mechanism 30 is suppressed.

At time t3, the vehicle stops. In this case, the coast stop control is finished and the engine 1 is restarted before the vehicle stops.

Figure 7:
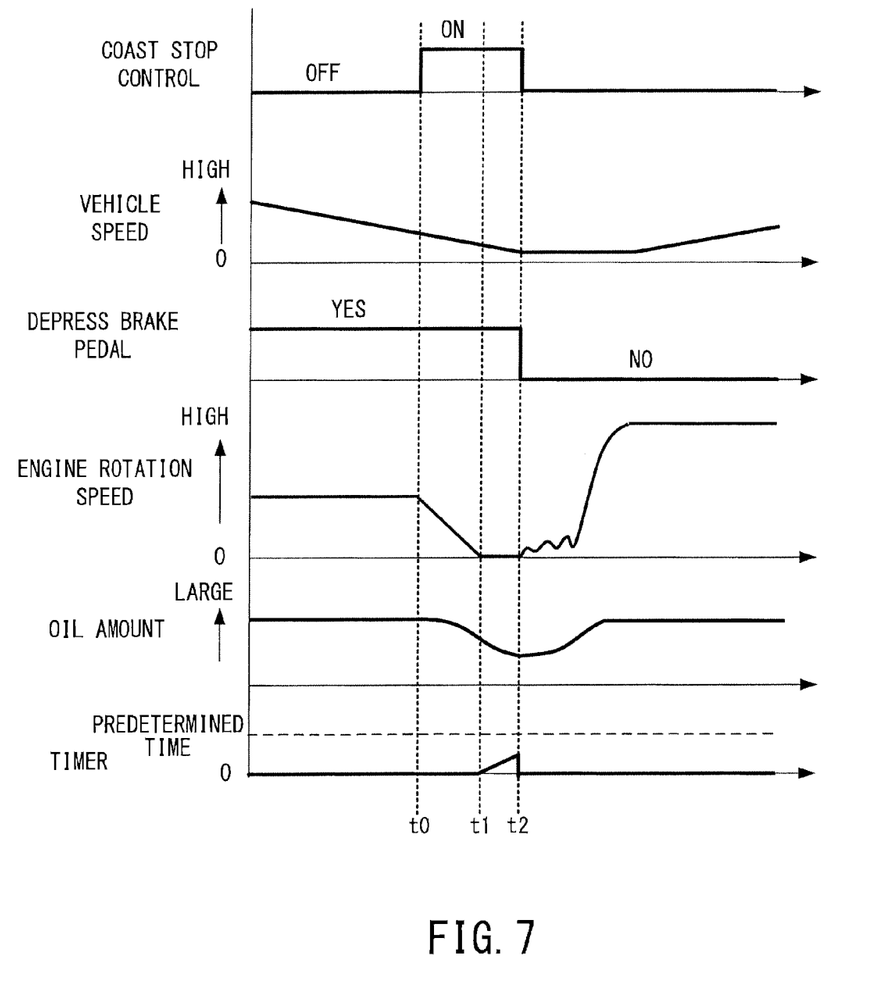
FIG. 7 is a time chart when the coast stop control is finished by a driver's intention to start.

FIG. 7 is a time chart when the coast stop control is finished by the driver's intention to start.

When the vehicle speed becomes the predetermined low vehicle speed and all of the coast stop conditions are satisfied at time t0, the coast stop control is started. By this, the engine 1 automatically stops and the engine rotation speed gradually decreases. Further, oil supplied from the mechanical oil pump 10*m* decreases due to the automatic stop of the engine 1, and no oil is supplied also from the electrical oil pump 10*e* due to the occurrence of the abnormality in the electrical oil pump 10*e*, wherefore the oil amount of the sub-transmission mechanism 30 decreases.

At time t1, the engine 1 stops. When the engine 1 stops, timer counting is started.

When the driver no longer depresses the brake pedal at time t2, the coast stop control is finished and the engine 1 is restarted. In this case, the coast stop control is finished and the engine 1 is restarted before the vehicle stops and before the timer count reaches the predetermined time.

Effects of this Embodiment are Described

When a coast stop control is performed and an abnormality occurs in an electrical oil pump, oil is no longer discharged from a mechanical oil pump and the electrical oil pump and the amount of oil in a hydraulic pressure chamber of a variator, a hydraulic pressure chamber of a sub-transmission mechanism and oil passages communicating with the hydraulic pressure chambers decreases. Thus, to generate a desired hydraulic pressure in the variator and the sub-transmission mechanism when an engine restarts, it is necessary to first fill the hydraulic pressure chambers and the oil passages with oil and, thereafter, further supply oil to the oil passages and the hydraulic pressure chambers. If the oil amount in the hydraulic pressure chambers and the oil passages decreases, it takes a longer time until a hydraulic pressure desired in the variator and the sub-transmission mechanism when the engine restarts is generated and the transmission of a drive force from the engine to drive wheels is delayed when the engine restarts, wherefore the startability of the vehicle may be reduced. Further, belt slippage may occur in the variator.

In this embodiment, even when the coast stop control is performed and an abnormality occurs in the electrical oil pump 10*e*, the coast stop control is continued until it is determined to finish the coast stop control based on the parameter not including the automatic stop of the drive source. By this, the drive force can be quickly transmitted to the drive wheels 7 when the engine 1 restarts, a reduction in the startability of the vehicle can be suppressed and belt slippage can be suppressed. Further, since the engine 1 is not immediately restarted even if there is an abnormality in the electrical oil pump 10*e*, a time during which the coast stop control is performed can be extended. Thus, fuel mileage can be improved by reducing fuel consumed by the engine 1.

By restarting the engine 1 when the vehicle stops, the drive force can be quickly transmitted to the drive wheels 7 when the engine 1 restarts and a reduction in the startability of the vehicle can be suppressed. Further, by restarting the engine 1 when the vehicle stops, oil is supplied to the transmission 4 in preparation for the restart, wherefore the vehicle can quickly start in response to the driver's intention to start.

Since no oil is discharged from the mechanical oil pump and the electrical oil pump when the coast stop control is performed and there is an abnormality in the electrical oil pump, the oil amount in the hydraulic pressure chamber of the variator, the hydraulic pressure chamber of the sub-transmission mechanism and the oil passages decreases. Thus, when the engine restarts, a hydraulic pressure desired in the variator and the sub-transmission mechanism cannot be generated unless the hydraulic pressure chambers and the oil passages are filled with oil and oil is further supplied to the hydraulic pressure chambers and the oil passages, and it takes a longer time until the desired hydraulic pressure is generated. When the coast stop control is performed while the vehicle is travelling on an uphill road without using this embodiment and an abnormality occurs in the electrical oil pump, the drive force is not transmitted to the drive wheels 7 and there is no braking force by the brake pedal until oil is supplied to the hydraulic pressure chambers and the oil passages and the desired hydraulic pressure can be generated if the brake pedal is no longer depressed and the accelerator pedal is depressed after the vehicle stops. Thus, the vehicle may move backward.

In this embodiment, when the vehicle stops, the engine 1 is restarted, the hydraulic pressure chamber of the variator 20, the hydraulic pressure chamber of the sub-transmission mechanism 30 and the oil passages are filled with oil and the desired hydraulic pressure is generated in the variator 20 and the sub-transmission mechanism 30. Thus, a drive force can be transmitted to the drive wheels 7 when the accelerator pedal is depressed, and a backward movement of the vehicle can be inhibited even if the brake pedal is no longer depressed and the accelerator pedal is depressed as described above.

Further, if this embodiment is not used and the engine is restarted immediately after the engine stops, the engine restarts immediately after the engine stops even when it takes time until the vehicle stops after the engine stops, e.g. when the vehicle is travelling on a downhill road.

Since, in this embodiment, the coast stop control is performed until the vehicle stops after the engine 1 stops, fuel mileage during this time can be improved as compared with the case where this embodiment is not used.

Since no oil is discharged from the mechanical oil pump and the electrical oil pump if the coast stop control is performed and there is an abnormality in the electrical oil pump, the oil amount in the hydraulic pressure chamber of the variator, the hydraulic pressure chamber of the sub-transmission mechanism and the oil passages decreases. If the oil amount decreases, it takes a longer time until a hydraulic pressure desired in the variator and the sub-transmission mechanism is generated by supplying oil to the hydraulic pressure chamber of the variator, the hydraulic pressure chamber of the sub-transmission mechanism and the oil passages when the engine restarts and the startability of the vehicle may be reduced.

In this embodiment, when the oil amount in the variator 20, the sub-transmission mechanism 30 and the like decreases and restartability is reduced, the engine 1 is restarted, whereby a drive force can be quickly transmitted to the drive wheels 7 when the vehicle restarts and a reduction in startability can be suppressed while the coast stop control is performed for an extended time and fuel mileage is improved.

The oil amount is determined to be insufficient when the timer count from the stop of the engine 1 reaches the predetermined time. Even if there is an abnormality in the electrical oil pump 10e, the hydraulic pressure is supplied from the mechanical oil pump 10m to the variator 20 and the like before the engine 1 stops. In this embodiment, a reduction in the oil amount can be accurately determined by determining a reduction in the oil amount in the transmission 4 based on elapsed time after the engine 1 stops and oil is no longer discharged from the mechanical oil pump 10m.

By determining whether or not there is an abnormality in the electrical oil pump 10e after the engine 1 automatically stops, the abnormality of the electrical oil pump 10e can be determined by detecting the hydraulic pressure even if the electrical oil pump 10e has no failure determining function. The failure determining function is a function capable of judging a failure of the electrical oil pump 10e based on a motor rotation speed of the electrical oil pump 10e, a current value and the like. Specifically, the electrical oil pump 10e having the failure determining function does not require another sensor for failure judgment. The electrical oil pump 10e having no failure deter mining function requires another sensor besides the electrical oil pump 10e such as a hydraulic pressure sensor for determining a failure by detecting a discharge pressure of the electrical oil pump 10 and confirming whether or not a discharge pressure as instructed is generated. In this embodiment, an abnormality can be determined without providing another sensor anew and cost can be suppressed by determining whether or not there is an abnormality in the electrical oil pump 10e after the engine 1 automatically stops and oil is no longer discharged from the mechanical oil pump 10m.

It goes without saying that the present invention is not limited to the above embodiment and includes various possible modifications and improvements within the scope of the technical concept thereof.

Although the counting is started by the timer after the engine 1 stops in this embodiment, it may be started by the timer after the automatic stop of the engine 1 is instructed. Similar effects can also be achieved by this.

Further, the predetermined time may be extended as the oil temperature detected by the oil temperature sensor 49 decreases. When the oil temperature is low, the viscosity of oil is high and the amount of oil leaking from the variator 20 and the like decreases. Thus, by extending the predetermined time as the oil temperature decreases, the execution period of the coast stop control can be extended and fuel mileage can be improved while oil shortage in the variator 20 and the like is suppressed.

Further, the coast stop control may also be used for an electrically-driven vehicle or the like including a drive motor instead of an engine and an oil pump to be driven by the drive motor.

Further, the coast stop control may be also be used for a vehicle including a forward/reverse switching mechanism, a vehicle including a step transmission, or the like.

This application claims priority from Japanese Patent Application No. 2011-268546, filed Dec. 8, 2011, which is incorporated herein by reference in its entirety.

What is claimed is:

1. A vehicle control device for controlling a vehicle including:
    a first drive source adapted to automatically stop based on an automatic stop command when a predetermined condition is satisfied:
    a power transmission unit arranged between the first drive source and drive wheels and adapted to transmit power according to a supplied or discharged hydraulic pressure;
    a first oil pump adapted to be driven by power generated by the first drive source and supply oil to the power transmission unit; and
    a second oil pump adapted to be driven by a second drive source different from the first drive source and supply the oil to the power transmission unit when the first drive source is in a state of the automatic stop;
    the vehicle control device comprising:
        an abnormality determination unit adapted to determine whether or not there is an abnormality in the second oil pump; and
        a control unit adapted to finish the automatic stop and restart the first drive source when the vehicle stops after the automatic stop command of the first drive source is output and if there is an abnormality in the second oil pump.

2. The vehicle control device according to claim 1, wherein the control unit is adapted to finish the automatic stop and restart the first drive source when an oil amount of the power transmission unit becomes equal to or less than a predetermined oil amount at which startability of the vehicle is reduced after the automatic stop command is output and if there is an abnormality in the second oil pump.

3. The vehicle control device according to claim 2, further comprising a first measurement unit adapted to measure a first elapsed time after the first drive source automatically stops, wherein:
    the control unit is adapted to determine that the oil amount of the power transmission unit is equal to or less than the predetermined oil amount when the first elapsed time reaches a first predetermined time.

4. The vehicle control device according to claim 2, further comprising a second measurement unit adapted to measure a second elapsed time after the automatic stop command is output to the first drive source, wherein:
    the control unit is adapted to determine that the oil amount of the power transmission unit is equal to or less than the predetermined oil amount when the second elapsed time reaches a second predetermined time.

5. The vehicle control device according to claim 3, further comprising an oil temperature detection unit adapted to detect temperature of the oil, wherein:
    the first elapsed time is longer as the oil temperature decreases.

6. The vehicle control device according to claim 1, further comprising a stop determination unit adapted to determine whether or not the first drive source is stopped, wherein:
    the abnormality determination unit is adapted to determine the abnormality of the second oil pump after the first drive source is stopped.

7. A vehicle control method for controlling a vehicle including:

a first drive source adapted to automatically stop based on an automatic stop command when a predetermined condition is satisfied:
a power transmission unit arranged between the first drive source and drive wheels and adapted to transmit power according to a supplied or discharged hydraulic pressure;
a first oil pump adapted to be driven by power generated by the first drive source and supply oil to the power transmission unit; and
a second oil pump adapted to be driven by a second drive source different from the first drive source and supply the oil to the power transmission unit when the first drive source is in a state of the automatic stop;
the vehicle control method comprising:
finishing the automatic stop and restarting the first drive source when the vehicle stops after the automatic stop command of the first drive source is output and if there is an abnormality in the second oil pump.

8. The vehicle control method for controlling the vehicle according to claim 7, wherein the automatic stop finishes and the first drive source restarts when an oil amount of the power transmission unit becomes equal to or less than a predetermined oil amount at which startability of the vehicle is reduced after the automatic stop command is output and if there is an abnormality in the second oil pump.

9. The vehicle control method for controlling the vehicle according to claim 8, further comprising measuring a first elapsed time after the first drive source automatically stops, wherein:
the oil amount of the power transmission unit is determined to be equal to or less than the predetermined oil amount when the first elapsed time reaches a first predetermined time.

10. The vehicle control method for controlling the vehicle according to claim 8, further comprising measuring a second elapsed time after the automatic stop command is output to the first drive source, wherein:
the oil amount of the power transmission unit is determined to be equal to or less than the predetermined oil amount when the second elapsed time reaches a second predetermined time.

11. The vehicle control method for controlling the vehicle according to claim 9, further comprising detecting temperature of the oil, wherein:
the first elapsed time is longer as the oil temperature decreases.

12. The vehicle control method for controlling the vehicle according to claim 7, further comprising determining whether or not the first drive source is stopped, wherein:
the abnormality of the second oil pump is determined after the first drive source is stopped.

13. A vehicle control device for controlling a vehicle including:
a first drive source adapted to automatically stop based on an automatic stop command when a predetermined condition is satisfied;
a power transmission means, which is arranged between the first drive source and drive wheels, for transmitting power according to a supplied or discharged hydraulic pressure;
a first oil pump adapted to be driven by power generated by the first drive source and supply oil to the power transmission means; and
a second oil pump adapted to be driven by a second drive source different from the first drive source and to supply the oil to the power transmission means when the first drive source is in a state of the automatic stop;
the vehicle control device comprising:
abnormality determination means for determining whether or not there is an abnormality in the second oil pump; and
control means for finishing the automatic stop and restarting the first drive source when the vehicle stops after the automatic stop command of the first drive source is output and if there is an abnormality in the second oil pump.

14. The vehicle control device according to claim 4, further comprising an oil temperature detection unit adapted to detect temperature of the oil, wherein:
the second elapsed time is longer as the oil temperature decreases.

15. The vehicle control method for controlling the vehicle according to claim 10, further comprising detecting temperature of the oil, wherein:
the second elapsed time is longer as the oil temperature decreases.

* * * * *